Figure 1:
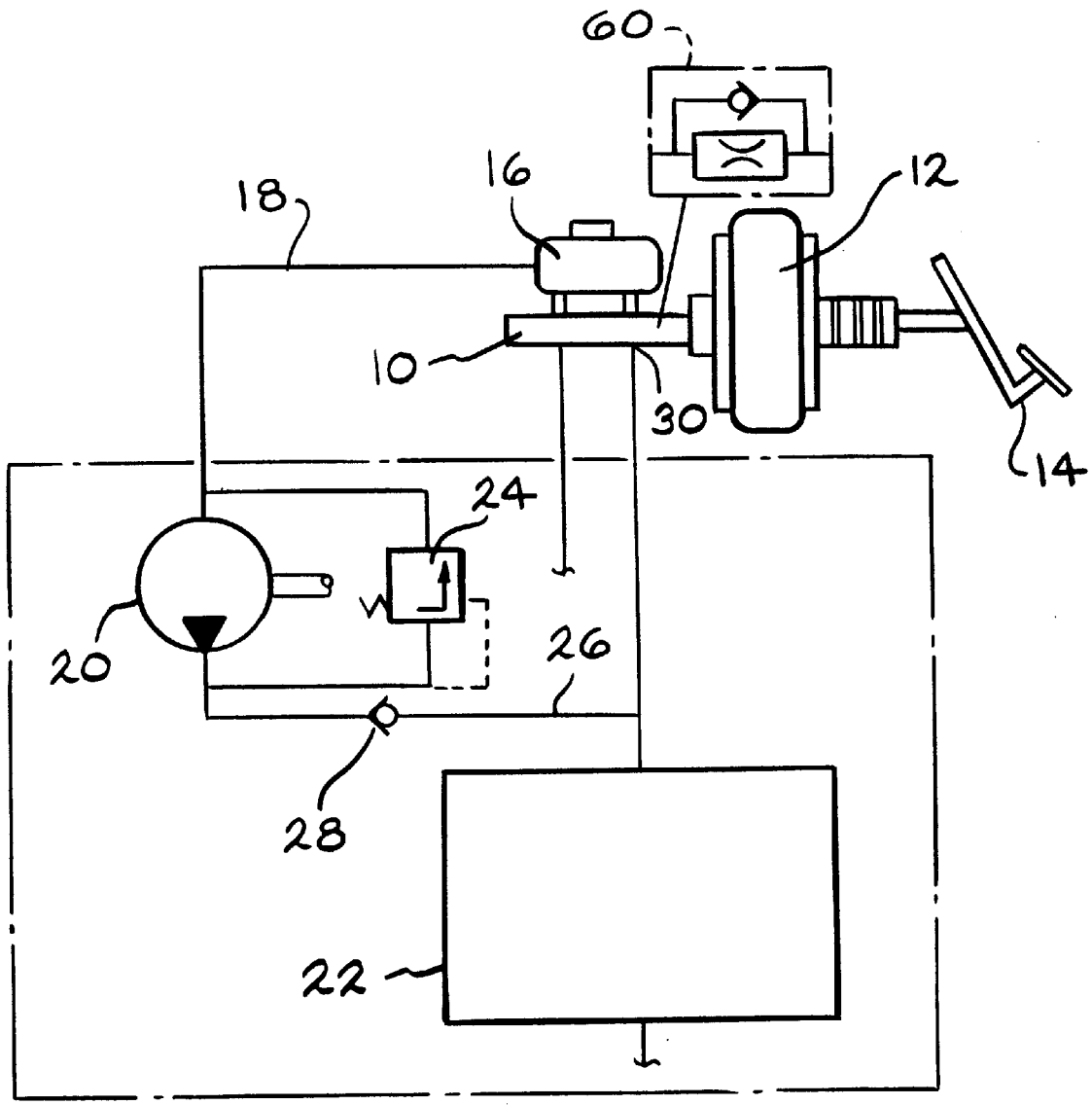

United States Patent
Barz et al.

[19]

[11] Patent Number: 5,937,649
[45] Date of Patent: Aug. 17, 1999

[54] BRAKE MASTER CYLINDER WITH RETURN CONNECTION

[75] Inventors: Uwe Barz, Ochtendung; Markus Mallmann, Pfalzfeld; Bernd Wagner, Rüscheid, all of Germany

[73] Assignee: Lucas Industries public limited company, Solihull, United Kingdom

[21] Appl. No.: 09/068,274

[22] PCT Filed: Oct. 22, 1996

[86] PCT No.: PCT/EP96/04587

§ 371 Date: May 5, 1998

§ 102(e) Date: May 5, 1998

[87] PCT Pub. No.: WO97/15481

PCT Pub. Date: May 1, 1997

[30] Foreign Application Priority Data

Oct. 27, 1995 [DE] Germany .......................... 195 40 151

[51] Int. Cl.[6] .............................. B60T 17/00; B60T 11/26
[52] U.S. Cl. ................................. 60/566; 60/585
[58] Field of Search .............................. 60/585, 586, 589, 60/565, 566, 591, 592

[56] References Cited

U.S. PATENT DOCUMENTS

| | | | |
|---|---|---|---|
| 3,685,289 | 8/1972 | Kobashi et al. ...................... | 60/592 X |
| 4,440,454 | 4/1984 | Belart et al. ............................ | 303/114 |
| 4,904,026 | 2/1990 | Bernhardt et al. .................... | 60/565 X |
| 5,061,016 | 10/1991 | Hirobe .................................. | 60/565 X |
| 5,332,302 | 7/1994 | Maas ...................................... | 60/589 X |
| 5,515,678 | 5/1996 | Kurokawa et al. ...................... | 60/591 |
| 5,542,253 | 8/1996 | Ganzel .................................. | 60/589 X |
| 5,544,485 | 8/1996 | Nakano et al. . | |

FOREIGN PATENT DOCUMENTS

| | | |
|---|---|---|
| 0219834 A2 | 4/1987 | European Pat. Off. . |
| 3806788 A1 | 9/1989 | Germany . |
| 4112134 A1 | 12/1992 | Germany . |
| 4445401 A1 | 6/1995 | Germany . |
| 63-176864 | 11/1988 | Japan . |
| 7-267072 | 10/1995 | Japan . |

*Primary Examiner*—John E. Ryznic
*Attorney, Agent, or Firm*—MacMillan, Sobanski & Todd, LLC

[57] ABSTRACT

A brake master cylinder (10) for a hydraulic vehicle brake system has a master cylinder housing (32) and at least one pressure chamber (40) designed therein. Connected to the pressure chamber (40) is a hydraulic fluid reservoir which, furthermore, is provided for connection to a precharge pump of a brake pressure regulating system. Moreover, the brake master cylinder (10) has a hydraulic fluid return connection (30) which makes a fluid connection between the delivery side of the precharge pump, the reservoir and the at least one pressure chamber (40). A throttle (60) is arranged in this liquid connection, said throttle not impeding a hydraulic fluid stream out of the reservoir into the at least one pressure chamber (40) and throttling a hydraulic fluid stream from the return connection (30) into the reservoir. The throttle (60) makes it possible to cause the precharge pump to act on the at least one pressure chamber (40), without an electromagnetic valve being interposed.

7 Claims, 6 Drawing Sheets

BRAKE MASTER CYLINDER WITH RETURN CONNECTION

The invention relates to a brake master cylinder for a hydraulic vehicle brake system according to the preamble of patent claim 1. The invention relates, in particular, to a brake master cylinder suitable for interacting with a brake pressure regulating system which comprises traction control and/or driving dynamics control. Such a brake master cylinder is known from DE 41 12 134 A1 which describes a wheelslip-controlled hydraulic brake system for automobiles.

Hydraulic vehicle brake systems are nowadays often equipped with a brake pressure regulating system which is intended, above all, to prevent the wheels of the vehicle from locking in the event of very sharp braking. A brake pressure regulating system of this type is usually referred to as an antilock system. Increasingly, however, the capabilities inherent in such a brake pressure system are also used for preventing or at least limiting the spin of driven vehicle wheels which may occur, in particular, during acceleration on slippery ground. This is referred to as traction control. Even further developed systems use the brake pressure regulating system in order to neutralize critical vehicle states, for example an imminent swerving of a vehicle on a bend approached too quickly. For this purpose, signals from various sensors are processed, which give information on instantaneous variables, such as, for example, driving speed, steering angle lock, transverse acceleration and other parameters describing the instantaneous driving state, whereupon, when a hazardous driving state is detected, the system attempts to eliminate this hazardous driving state, inter alia by controlled braking actions on individual wheels. Such systems are designated as driving dynamics controls. A fundamental difference between a brake pressure regulating system designed only for antilock braking and a brake pressure regulating system which is employed, furthermore, for traction control or driving dynamics control is that the latter must be capable of building up brake pressure when the brake master cylinder is both actuated and not actuated, since the vehicle driver himself does not actuate the brake when traction control or driving dynamics control is taking effect.

Conventional brake pressure regulating systems have a so-called return pump which is designed for high pressure and a small volumetric flow and is not selfpriming. The hydraulic fluid therefore has to be supplied to the return pump under a particular admission pressure. In brake pressure regulating systems designed only for antilock braking, the pressure generated by the driver in the brake master cylinder by actuating the brake pedal is, under certain circumstances, sufficient for this purpose. If, however, the brake pressure regulating system is also to be employed for traction control and/or driving dynamics control, there must be a so-called precharge pump which can provide the return pump with sufficient admission pressure even when the brake master cylinder is not actuated. The installation of a precharge pump in a brake pressure regulating system normally requires a plurality of electromagnetic valves.

The object on which the invention is based is to simplify brake pressure regulating systems with a traction control and/or driving dynamics control function.

Proceeding from a brake master cylinder of the type initially mentioned, this object is achieved, according to the invention, in that a throttle is arranged in the fluid connection, existing in the installed state of the brake master cylinder, between the delivery side of the precharge pump, the reservoir and the at least one pressure chamber, said throttle not impeding a hydraulic fluid stream out of the reservoir into the at least one pressure chamber and throttling a hydraulic fluid stream from the return connection to the reservoir. By virtue of the common fluid connection between the delivery side of the precharge pump, the reservoir and the at least one pressure chamber in the master cylinder housing, according to the invention the precharge pump acts directly on the at least one pressure chamber and thereby ensures that there is a particular admission pressure in at least the brake circuit which is connected to the one pressure chamber. The direction-dependent throttle on the one hand allows an unimpeded hydraulic fluid stream out of the reservoir into the at least one pressure chamber, but, on the other hand, due to its throttling effect in the opposite direction of flow, that is to say from the return connection to the reservoir, ensures that, during operation, the precharge pump can build up a specific admission pressure in the at least one pressure chamber of the brake master cylinder. In the solution according to the invention, it is possible to dispense with an electromagnetic valve in a hydraulic line leading from the delivery side of the precharge pump to the reservoir, said electromagnetic valve being necessary in conventional systems. A particular feature of all the exemplary embodiments according to the invention is that the pressure generated by the precharge pump can act directly on the at least one pressure chamber of the brake master cylinder and consequently-directly on at least one brake circuit, thus making it possible to combine a brake master cylinder according to the invention with a brake pressure regulating system which does not itself comprise a precharge pump, so that the brake pressure regulating system can also be provided with a traction control and/or driving dynamics control function at relatively low outlay.

In one exemplary embodiment of a brake master cylinder according to the invention, the return connection, the one pressure chamber and the reservoir are arranged in this order one behind the other in the direction of flow of the hydraulic fluid stream and the throttle is arranged between the one pressure chamber and the reservoir. Preferably, in this exemplary embodiment, the throttle is arranged in the one pressure chamber, that is to say the hydraulic fluid stream is led from the precharge pump via the return connection into the one pressure chamber and is prevented, by the throttle arranged therein, from flowing further, without any delay, out of the pressure chamber into the reservoir. In this last mentioned exemplary embodiment, the throttle may, for example, be connected to a primary piston arranged in the one pressure chamber, in such a way that said throttle can be displaced together with the primary piston.

In another exemplary embodiment of a brake master cylinder according to the invention, the return connection is connected to an annular space which precedes the one pressure chamber and which is itself connected to the one pressure chamber and to the reservoir. The connection between the annular space and the one pressure chamber is made, for example, by means of a central valve which is arranged in the primary piston of the brake master cylinder and which is open in its position of rest which it assumes when the brake master cylinder is not actuated. In this exemplary embodiment, therefore, the reservoir, the one pressure chamber and the return connection each have a fluid connection to the annular space and the throttle is arranged between the reservoir and the annular space. In this case, the throttle may be suitably integrated into the brake master cylinder, for example into a line leading from the annular space to the reservoir and designed in the master cylinder housing, but it may also be arranged in a nipple of the reservoir, for example in the form of an insert pushed into the nipple.

In yet another exemplary embodiment of a brake master cylinder according to the invention, the throttle is arranged in an adaptor piece which is located between the reservoir and the master cylinder housing and which comprises the return connection. This solution according to the invention is highly cost-effective, since no change has to be made on brake master cylinder versions already produced. Furthermore, such a solution ensures the highest possible flexibility, since, depending on the desired outfitting of a vehicle, either the adaptor piece can be used or, instead of the latter, there can be an intermediate piece which merely bridges the overall height of the adaptor piece without any further function.

Figure 2:
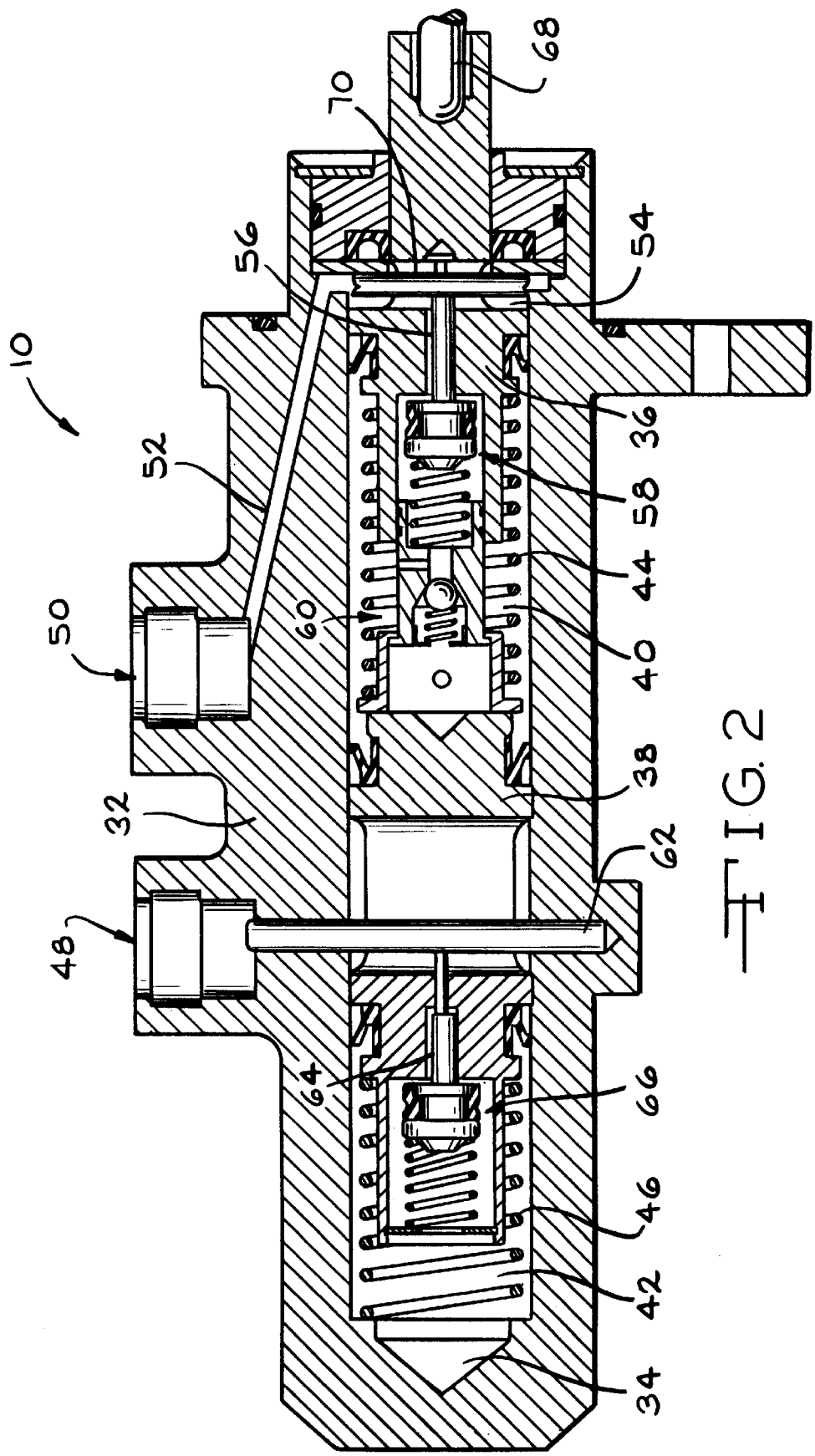
Figure 3:
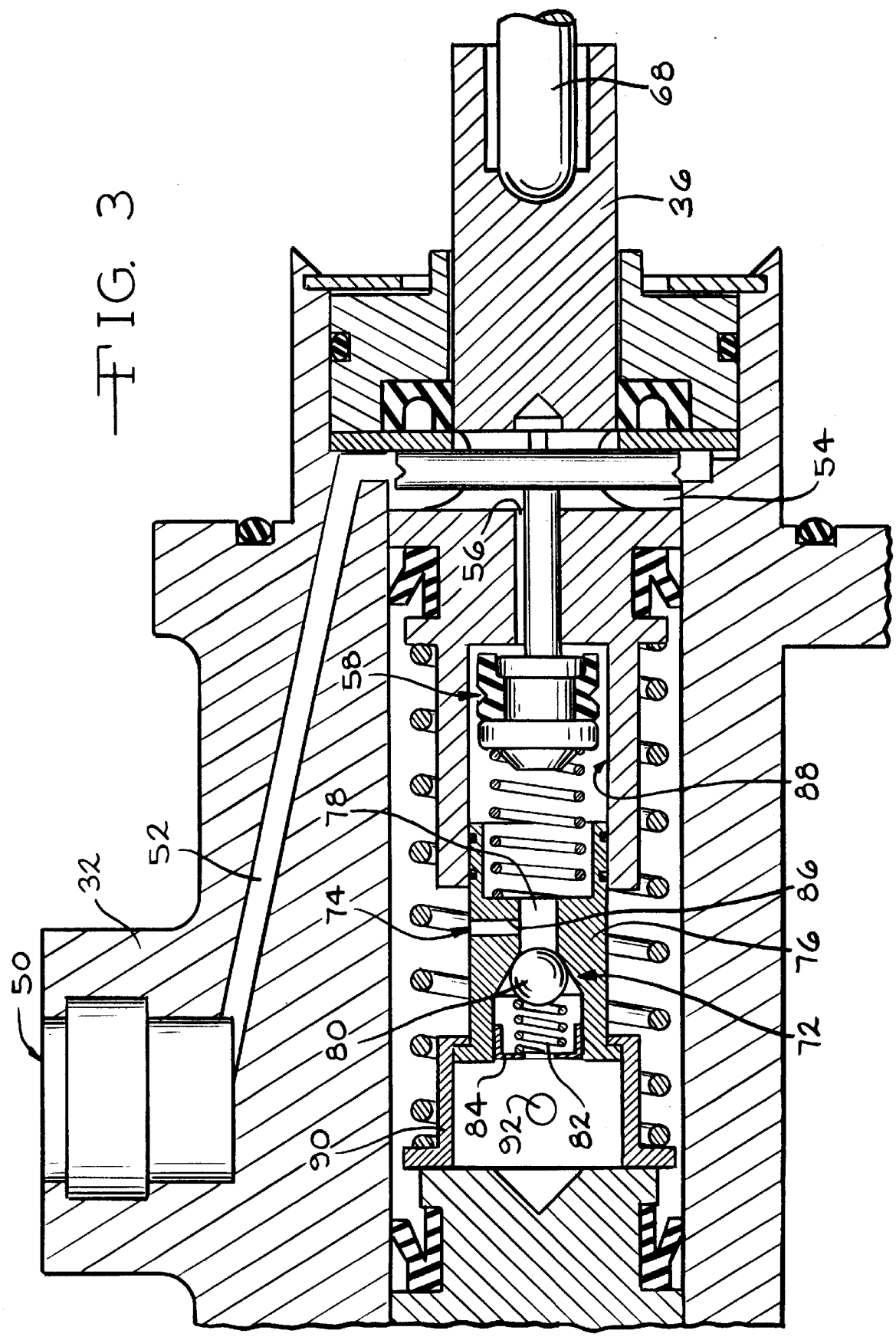
Figure 4:
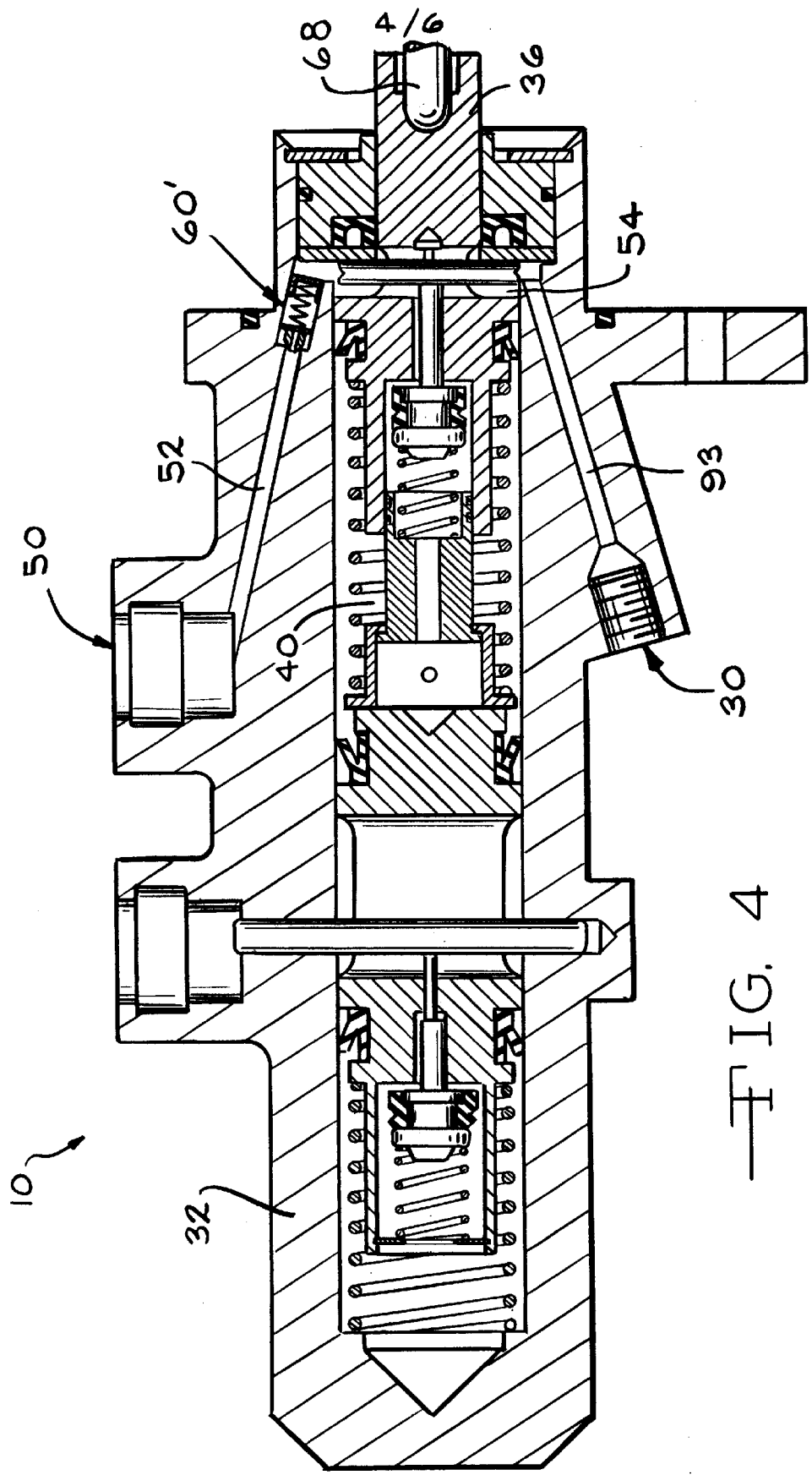
Figure 5:
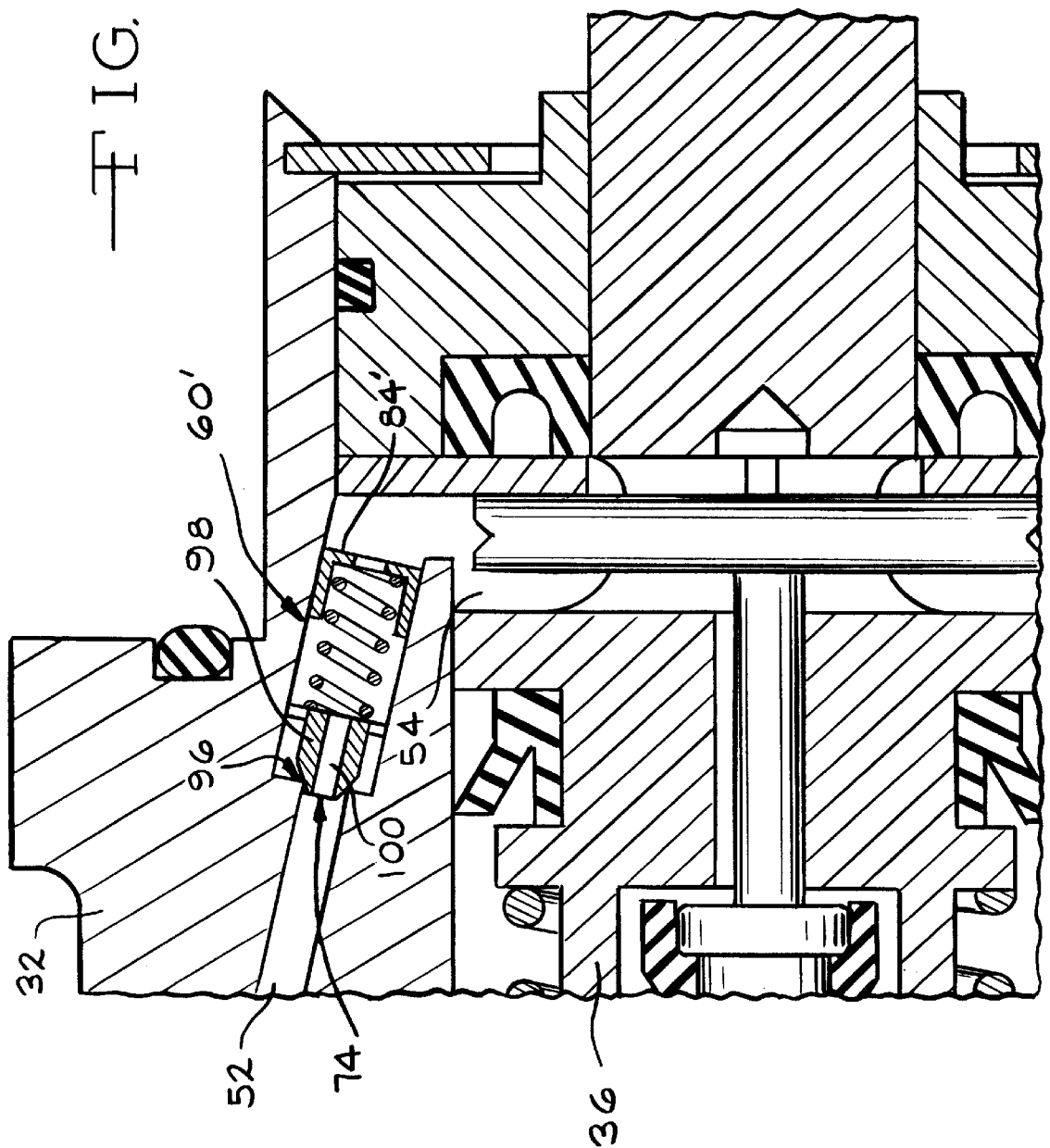
Figure 6:
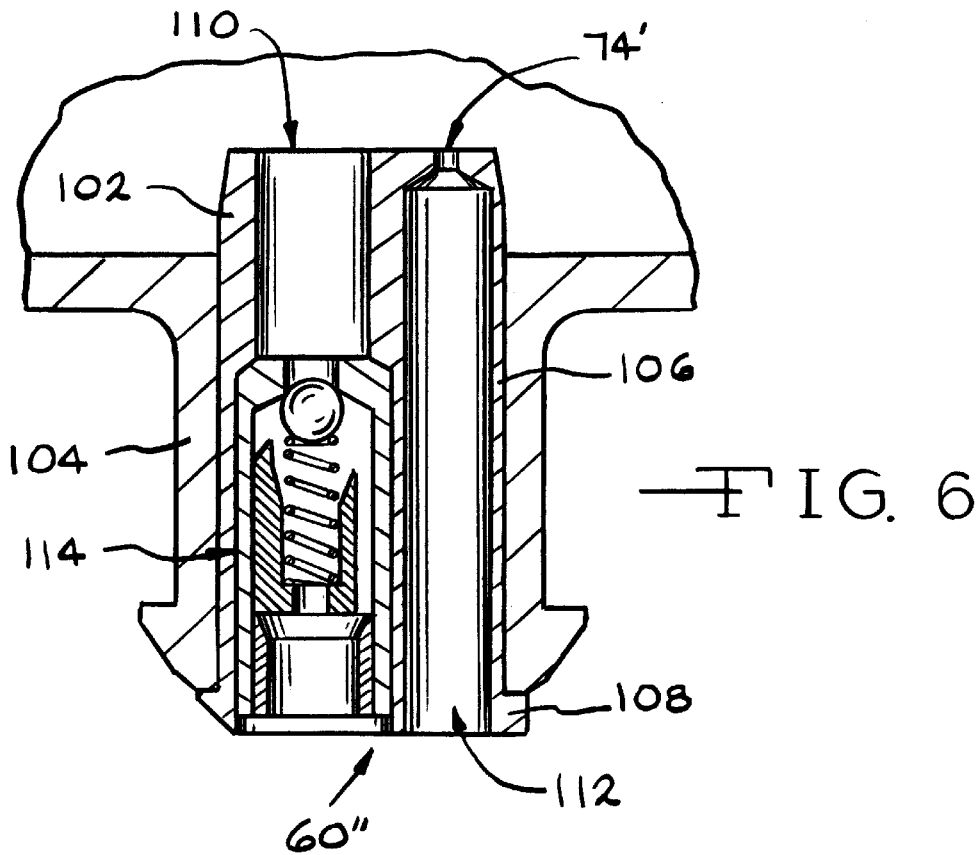
Figure 7:
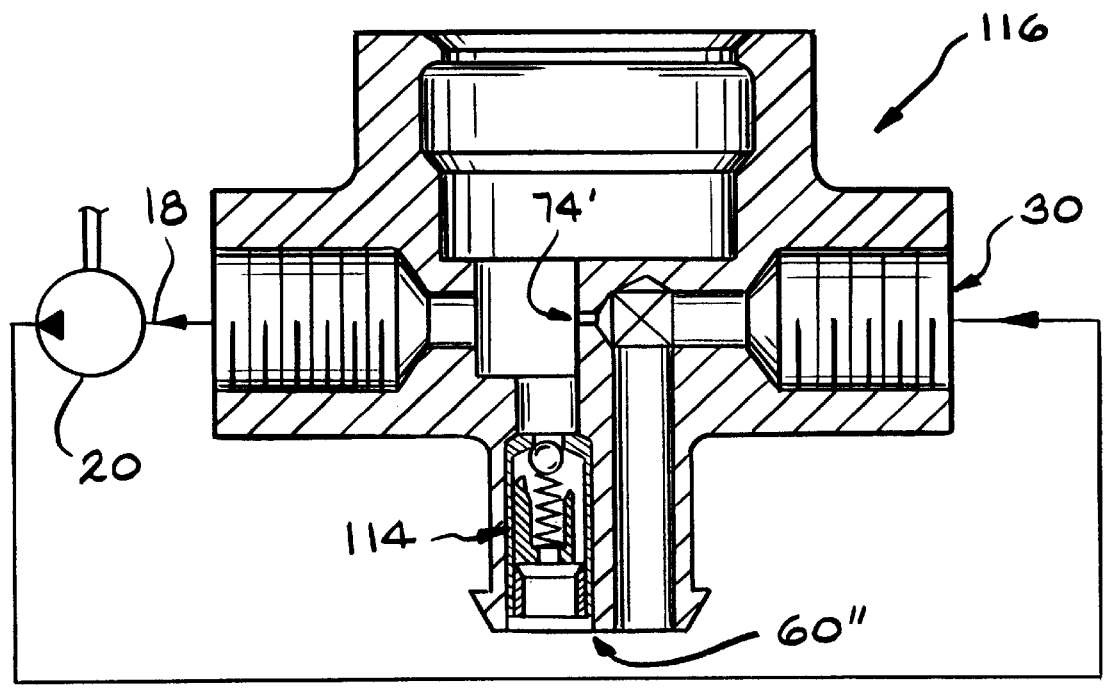

Several exemplary embodiments of the brake master cylinder according to the invention are explained in more detail below with reference to diagrammatic Figures of which:

FIG. 1 shows a basic diagram of a brake master cylinder according to the invention which is combined with a precharge pump and with a brake pressure regulating system, FIG. 2 shows a longitudinal section through a first exemplary embodiment of a brake master cylinder according to the invention, FIG. 3 shows an enlarged illustration of part of FIG. 2, FIG. 4 shows a longitudinal section through a second exemplary embodiment of a brake master cylinder according to the invention, FIG. 5 shows a detail from FIG. 4 in an enlarged illustration, FIG. 6 shows a section through a nipple of a hydraulic fluid reservoir according to a third exemplary embodiment of a brake master cylinder according to the invention, and FIG. 7 shows a section through an adaptor piece according to a fourth exemplary embodiment of a brake master cylinder according to the invention.

FIG. 1 shows diagrammatically a brake master cylinder 10 which is clamped in the conventional way together with a brake booster 12 to form a unit. An actuating force can be introduced via a brake pedal 14 into this unit consisting of the brake master cylinder 10 and of the brake booster 12.

Associated with the brake master cylinder 10 is a hydraulic fluid reservoir 16 which is connected to the brake master cylinder 10 in a fluid conducting manner via two nipples. A hydraulic line 18 connects the reservoir 16 to a precharge pump 20 which supplies the admission pressure for a return pump (not shown) of a brake pressure regulating system 22 illustrated merely as a box. The precharge pump 20, which, in contrast to the return pump (not shown), is designed for low pressure and a high volumetric flow, has a pressure relief valve 24 which comes into action when the delivery side of the precharge pump 20 is closed and spills away excess pressure. The precharge pump 20 may alternatively also be designed, for example as a vane cell pump with correspondingly large gaps, in such a way that it deals readily with operating conditions occurring when the delivery side is closed. There is then no need for the pressure relief valve 24. On the delivery side, the precharge pump 20 is connected via a hydraulic line 26 having a nonreturn valve 28, on the one hand, to the brake pressure regulating system 22 and, on the other hand, via a return connection 30 to the brake master cylinder 10.

A first embodiment of a brake master cylinder 10 is shown in more detail in FIGS. 2 and 3. The brake master cylinder 10 has a master cylinder housing 32 with a longitudinal bore 34, in which a first pressure piston, designated as a primary piston 36, and a second pressure piston, designated as a secondary piston 38, are sealingly arranged. A first pressure chamber 40 is delimited in the longitudinal bore 34 between the primary piston 36 and the secondary piston 38, said pressure chamber being connectable to a first brake circuit of the vehicle brake system via an outlet (not shown). The secondary piston 38 and the housing-inner end of the longitudinal bore 34 similarly delimit a second pressure chamber 42 which is connectable to a second brake circuit of the vehicle brake system. The pistons 36 and 38 are prestressed by restoring springs 44 and 46 into their initial position which they assume when the brake master cylinder 10 is in the nonactuated state and which is illustrated in FIGS. 2 and 3.

The hydraulic fluid reservoir 16, not illustrated in FIGS. 2 and 3, engages with its two nipples into correspondingly shaped connecting orifices 48 and 50 of the master cylinder housing 32. Hydraulic fluid can then pass out of the reservoir 16 through the connecting orifice 50 on the right in FIG. 2, an adjoining duct 52 and an annular space 54 preceding the first pressure chamber 40 and, further, through a central passage orifice 56 in the primary piston 36 past a first central valve 58 and a throttle 60 which is dependent on the direction of flow, and the purpose of which will be explained in more detail below, into the first pressure chamber 40. Hydraulic fluid can pass out of the reservoir 16 through the connecting orifice 48 on the left in FIG. 2 and a hollow crosspin 62 and, further, through a central passage orifice 64 in the secondary piston 38 past a second central valve 66 into the second pressure chamber 42. An actuating force can be introduced into the brake master cylinder 10 or into its primary piston 36 via an input rod 68 connected to the brake pedal 14, said actuating force displacing the primary piston 36 and the secondary piston 38, coupled hydraulically thereto, in the pressure build-up direction, that is to say to the left in FIG. 2. When the brake master cylinder 10 is actuated, the two central valves 58 and 66, which are kept open by butting respectively on a crosspin 70 and the crosspin 62 in the position of rest of the primary and secondary pistons 36 and 38, close and thus allow pressure to build up in the pressure chambers 40 and 42.

The throttle 60 dependent on the direction of flow consists functionally of a nonreturn valve 72 and of a throttle orifice 74 (see FIG. 3). In the first exemplary embodiment illustrated in FIG. 3, the throttle 60 dependent on the direction of flow is formed by an essentially tubular basic body 76 which is provided with a passage bore 78 conically narrowing in the middle region. The conical narrowing of the passage bore 78 forms the valve seat for a ball 80 of the nonreturn valve 72. The ball 80 is prestressed against the valve seat by means of a spring 82. The spring 82 is held by a spring holding plate 84 of U-shaped cross-section which is pressed into that end of the passage bore 78 of the basic body 76 which is on the left in relation to FIG. 3. In the first exemplary embodiment, the throttle orifice 74 is formed by a radial duct 86 in the basic body 76, said duct extending between the portion of smaller diameter of the passage bore 78 and the outer circumferential surface of the basic body 76. The basic body 76 penetrates with its end portion on the right in FIG. 3 into a bore 88 of the primary piston 36, the first central valve 58 also being received in said bore. Arranged displaceably on that end portion of the basic body 76 which is on the left in FIG. 3 is a hollow-cylindrical spring collar 90, on which the restoring spring 44 of the primary piston 36 is supported. The spring collar 90 has a plurality of radial passages 92 which make an unthrottled connection between the first pressure chamber 40 and the throttle 60.

The functioning of the brake master cylinder 10 will be explained in more detail below. It is presupposed, in this case, that the hydraulic line 26 (see FIG. 1) coming from the precharge pump 20 opens into the first pressure chamber 40 of the brake master cylinder 10, that is to say the return connection 30 connects the hydraulic line 26 to the first pressure chamber 40 (not illustrated in FIGS. 2 and 3).

During normal braking, as already indicated, an actuating force is transmitted to the primary piston 36 via the input rod 68, as a result of which the two pistons 36 and 38 are displaced to the left, with the consequence that brake pressure is built up in the pressure chambers 40 and 42 after the closing of the central valves 58 and 66 which takes place during this displacement. When the actuating force introduced via the input rod 68 lapses after braking has been executed, the restoring springs 44 and 46 move the pistons 36 and 38 to the right back into their initial positions again. Toward the end of this return stroke movement, the two central valves 58 and 66 open and hydraulic fluid flows out of the reservoir 16 along the paths already mentioned above into the pressure chambers 40 and 42. In this case, the throttle 60 does not oppose any appreciable resistance to the hydraulic fluid flowing into the first pressure chamber 40, since the nonreturn valve 72 is prestressed only slightly into its closing position and therefore opens easily. Throttling which is undesirable with regard to this direction of flow of the hydraulic fluid does not take place and the efficiency of the brake master cylinder 10 is maintained.

During a normal braking operation just described, the precharge pump 20 is not put into operation. This occurs, however, when a control unit, assigned to the brake pressure regulating system 22 and not illustrated separately, detects that, for example, one of the driven wheels of the vehicle is spinning. The precharge pump 20, activated thereupon by the control unit, then supplies to the first pressure chamber 40, via the hydraulic line 26, a specific admission pressure which may be, for example, in the region of 3 bar. The throttle 60 arranged in the first pressure chamber 40 prevents this precharge pressure from being transferred immediately into the reservoir 16, because the nonreturn valve 72 remains closed and the throttle orifice 74, formed by the radial duct 86 in the basic body 76 of the throttle 60, allows only a greatly delayed transfer of pressure. In the first pressure chamber 40, therefore, essentially the precharge pressure generated by the precharge pump 20 builds up. Depending on the magnitude of the precharge pressure generated and the restoring force of the restoring spring 46, a specific precharge pressure will also build up in the second pressure chamber 42.

The precharge pressure generated in the first pressure chamber 40 and, if appropriate, also the second pressure chamber 42 makes it possible, then, despite the brake master cylinder not being actuated, for the brake pressure regulating system 22 to function correctly, this precharge pressure being supplied in the conventional way to the return pump (not shown) of said system. A second exemplary embodiment of the brake master cylinder 10, illustrated in FIGS. 4 and 5, is essentially functionally identical to the first exemplary embodiment described previously, but differs in the arrangement of the throttle 60 and the return connection 30. In the second exemplary embodiment, the return connection 30 to be connected to the hydraulic line 26 does not open into the first pressure chamber 40, but, via a duct 93, into the annular space 54 preceding the pressure chamber 40 (see FIG. 4). The somewhat modified throttle, designated therefore by 60', is arranged, in the second exemplary embodiment, in a widened end portion 94 of the duct 52 which connects the connecting orifice 50 to the annular space 54. In the case of the throttle 60', the nonreturn valve and throttle orifice are formed by a valve body 98 which is prestressed resiliently against a seat 96 and through which a duct 100 representing the throttle orifice passes axially. 84' designates a spring holding plate which is pressed into that end of the duct 52 on the right in FIG. 5 and which holds the spring prestressing the valve body 98 against the seat 96.

In a third embodiment of the brake master cylinder 10, modified in relation to the second exemplary embodiment, the throttle 60" is not located in the duct 52 of the master cylinder housing 32, but is designed in the form of an insert 102 which is inserted into a nipple 104 of the reservoir 16, said nipple being provided for connection to the connecting orifice 50. As emerges from FIG. 6, the insert 102 consists of a cylindrical basic body 106 which has, at its outer end, a rim 108 as push-in limitation and two axial passage recesses 110 and 112. Inserted into the passage recess 110 on the left in FIG. 6 is a conventional nonreturn valve 114 which virtually does not impede an outhydraulic fluid stream from the reservoir 16, but blocks the return hydraulic fluid stream into the reservoir 16. The passage recess 112 on the right in FIG. 6 is greatly narrowed, at its end arranged in the reservoir 16, to form a throttle orifice 74'. According to the third exemplary embodiment, the throttle 60" may be integrated into a conventional brake master cylinder 10 without any appreciable design changes.

In a fourth exemplary embodiment (see FIG. 7), the throttle 60" of the third exemplary embodiment is integrated into a cruciform adaptor piece 116 which is inserted between the reservoir 16 and the connecting orifice 50 of the master cylinder housing 32. In contrast to the first three exemplary embodiments, in the fourth exemplary embodiment the return connection 30 is not designed on the master cylinder housing 32, but on the adaptor piece 116. That connection of the adaptor piece 116 which is located opposite the return connection 30 in FIG. 7 receives the hydraulic line 18 which is connected at its other end to the suction side of the precharge pump 20. That connection of the adaptor piece 116 which is at the top in FIG. 7 receives the one nipple of the reservoir 16 via a rubber sleeve, whilst the opposite lower connection of the adaptor piece is likewise to be inserted into the connecting orifice 50 via a conventional rubber sleeve. If the adaptor piece 116 is used, it is not necessary to make any design change to conventional master cylinder housings.

Brake master cylinders 10 according to the second, third and fourth exemplary embodiments have the advantage of statistically greater failure safety of the vehicle brake systems, since the return connection 30 does not open directly into the first pressure chamber 40.

We claim:

1. Brake master cylinder for a hydraulic vehicle brake system, with a master cylinder housing and at least one pressure chamber designed therein, with a hydraulic fluid reservoir which is connected to the at least one pressure chamber and which, furthermore, is provided for connection to a precharge pump of a brake pressure regulating system, and with a hydraulic fluid return connection which makes a fluid connection between the delivery side of the precharge pump, the reservoir and at least the one pressure chamber, characterized in that a throttle is arranged in this fluid connection, said throttle not impeding a hydraulic fluid stream out of the reservoir into the at least one pressure chamber and throttling a hydraulic fluid stream from the return connection into the reservoir.

2. Brake master cylinder according to claim 1, characterized in that the return connection, the one pressure chamber and the reservoir are arranged one behind the other in the return flow direction of the hydraulic fluid stream and the throttle is arranged between the one pressure chamber and the reservoir.

3. Brake master cylinder according to claim 2, characterized in that the throttle is arranged in the one pressure chamber.

4. Brake master cylinder according to claim 1, characterized in that the return connection is connected to an annular space which precedes the one pressure chamber and which is itself connected to the one pressure chamber and to the reservoir.

5. Brake master cylinder according to claim 4, characterized in that the throttle is arranged between the reservoir and the annular space.

6. Brake master cylinder according to claims 2, 4 or 5, characterized in that the throttle is arranged in a nipple of the reservoir.

7. Brake master cylinder according to claim 1, characterized in that the throttle is arranged in an adaptor piece which is located between the reservoir and the master cylinder housing and which comprises the return connection.

* * * * *